United States Patent
Yang et al.

(10) Patent No.: US 10,234,725 B2
(45) Date of Patent: Mar. 19, 2019

(54) PHOTOLUMINESCENCE COLOR DISPLAY

(71) Applicant: Intematix Corporation, Fremont, CA (US)

(72) Inventors: Haitao Yang, San Jose, CA (US); Yi-Qun Li, Danville, CA (US)

(73) Assignee: Intematix Corporation, Fremont, CA (US)

( * ) Notice: Subject to any disclaimer, the term of this patent is extended or adjusted under 35 U.S.C. 154(b) by 0 days.

(21) Appl. No.: 15/078,921

(22) Filed: Mar. 23, 2016

(65) Prior Publication Data

US 2017/0023830 A1 Jan. 26, 2017

Related U.S. Application Data

(60) Provisional application No. 62/137,195, filed on Mar. 23, 2015.

(51) Int. Cl.
*G02F 1/1333* (2006.01)
*G02F 1/1335* (2006.01)
*G02B 5/20* (2006.01)
*G02F 1/1343* (2006.01)

(52) U.S. Cl.
CPC ....... *G02F 1/133617* (2013.01); *G02B 5/201* (2013.01); *G02F 1/134336* (2013.01); *G02F 2202/108* (2013.01)

(58) Field of Classification Search
CPC ......... G02F 1/133617; G02F 1/134336; G02F 2202/108; G02B 5/201
USPC .......................................... 349/106
See application file for complete search history.

(56) References Cited

U.S. PATENT DOCUMENTS

| | | |
|---|---|---|
| 2,924,732 A | 2/1960 | Lehman |
| 3,290,255 A | 12/1966 | Smith |
| 3,593,055 A | 7/1971 | Geusic et al. |
| 3,670,193 A | 6/1972 | Thorington et al. |
| 3,676,668 A | 7/1972 | Collins et al. |
| 3,691,482 A | 9/1972 | Pinnow et al. |
| 3,709,685 A | 1/1973 | Hercock et al. |
| 3,743,833 A | 7/1973 | Martie et al. |

(Continued)

FOREIGN PATENT DOCUMENTS

| | | |
|---|---|---|
| CN | 1854853 A | 11/2006 |
| CN | 101034225 A | 9/2007 |

(Continued)

OTHER PUBLICATIONS

"Fraunhofer-Gesellschaft: Research News Special 1997", http://www.fhg.de/press/md-e/md1997/sondert2.hlm,(accessed on Jul. 23, 1998), Jan. 1997, Publisher: Fraunhofer Institute.

(Continued)

*Primary Examiner* — Charles Chang
(74) *Attorney, Agent, or Firm* — Vista IP Law Group, LLP

(57) ABSTRACT

A photoluminescence color display comprises a display panel that displays red, green and blue sub-pixel areas, an excitation source operable to generate excitation radiation for operating the display, and a combined layer of photoluminescence materials and filter pigments. The combined layer comprises at least one photoluminescence material, such as a phosphor material or quantum dots, that is operable to emit light corresponding to red, green and blue sub-pixel areas of the display in response to said excitation radiation.

11 Claims, 5 Drawing Sheets

(56) References Cited

U.S. PATENT DOCUMENTS

| | | |
|---|---|---|
| 3,763,405 A | 10/1973 | Mitsuhata |
| 3,793,046 A | 2/1974 | Wanmaker et al. |
| 3,819,973 A | 6/1974 | Hosford |
| 3,819,974 A | 6/1974 | Stevenson et al. |
| 3,849,707 A | 11/1974 | Braslau et al. |
| 3,875,456 A | 4/1975 | Kana et al. |
| 3,932,881 A | 1/1976 | Mita et al. |
| 3,937,998 A | 2/1976 | Verstegen et al. |
| 3,972,717 A | 8/1976 | Wiedemann |
| 4,047,075 A | 9/1977 | Schober! |
| 4,081,764 A | 3/1978 | Christmann et al. |
| 4,104,076 A | 8/1978 | Pons |
| 4,143,394 A | 3/1979 | Schoeberl |
| 4,176,294 A | 11/1979 | Thornton, Jr. |
| 4,176,299 A | 11/1979 | Thornton |
| 4,211,955 A | 7/1980 | Ray |
| 4,305,019 A | 12/1981 | Graff et al. |
| 4,315,192 A | 2/1982 | Skwirut et al. |
| 4,416,514 A | 11/1983 | Plummer |
| 4,443,532 A | 4/1984 | Joy et al. |
| 4,559,470 A | 12/1985 | Murakami et al. |
| 4,573,766 A | 3/1986 | Bournay, Jr. et al. |
| 4,618,555 A | 10/1986 | Suzuki et al. |
| 4,638,214 A | 1/1987 | Beers et al. |
| 4,667,036 A | 5/1987 | Iden et al. |
| 4,678,285 A | 7/1987 | Ohta et al. |
| 4,727,003 A | 2/1988 | Ohseto et al. |
| 4,772,885 A | 9/1988 | Uehara et al. |
| 4,830,469 A | 5/1989 | Breddels et al. |
| 4,845,223 A | 7/1989 | Seybold et al. |
| 4,859,539 A | 8/1989 | Tomko et al. |
| 4,915,478 A | 4/1990 | Lenko et al. |
| 4,918,497 A | 4/1990 | Edmond |
| 4,946,621 A | 8/1990 | Fouassier et al. |
| 4,992,704 A | 2/1991 | Stinson |
| 5,077,161 A | 12/1991 | Law |
| 5,110,931 A | 5/1992 | Dietz et al. |
| 5,126,214 A | 6/1992 | Tokailin et al. |
| 5,131,916 A | 7/1992 | Eichenauer et al. |
| 5,143,433 A | 9/1992 | Farrell |
| 5,143,438 A | 9/1992 | Giddens et al. |
| 5,166,761 A | 11/1992 | Olson et al. |
| 5,208,462 A | 5/1993 | O'Connor et al. |
| 5,210,051 A | 5/1993 | Carter, Jr. |
| 5,211,467 A | 5/1993 | Seder |
| 5,237,182 A | 8/1993 | Kitagawa et al. |
| 5,264,034 A | 11/1993 | Dietz et al. |
| 5,283,425 A | 2/1994 | Imamura |
| 5,369,289 A | 11/1994 | Tamaki et al. |
| 5,405,709 A | 4/1995 | Littman et al. |
| 5,439,971 A | 8/1995 | Hyche |
| 5,518,808 A | 5/1996 | Bruno et al. |
| 5,535,230 A | 7/1996 | Abe |
| 5,557,168 A | 9/1996 | Nakajima et al. |
| 5,563,621 A | 10/1996 | Silsby |
| 5,578,839 A | 11/1996 | Nakamura et al. |
| 5,583,349 A | 12/1996 | Norman et al. |
| 5,585,640 A | 12/1996 | Huston et al. |
| 5,619,356 A | 4/1997 | Kozo et al. |
| 5,640,792 A | 6/1997 | Smith et al. |
| 5,660,461 A | 8/1997 | Ignatius et al. |
| 5,677,417 A | 10/1997 | Muellen et al. |
| 5,679,152 A | 10/1997 | Tischler et al. |
| 5,763,901 A | 6/1998 | Komoto et al. |
| 5,770,887 A | 6/1998 | Tadatomo et al. |
| 5,771,039 A | 6/1998 | Ditzik |
| 5,777,350 A | 7/1998 | Nakamura et al. |
| 5,869,199 A | 2/1999 | Kido |
| 5,926,239 A | 7/1999 | Kumar et al. |
| 5,959,316 A | 9/1999 | Lowery |
| 5,962,971 A | 10/1999 | Chen |
| 6,137,217 A | 10/2000 | Pappalardo et al. |
| 6,295,106 B1 | 9/2001 | Fukuzawa et al. |
| 6,340,824 B1 | 1/2002 | Komoto et al. |
| 6,348,669 B1 | 2/2002 | Rudd Little et al. |
| 6,504,301 B1 | 1/2003 | Lowery |
| 6,576,488 B2 | 6/2003 | Collins et al. |
| 6,586,874 B1 | 7/2003 | Komoto et al. |
| 6,600,175 B1 | 7/2003 | Baretz et al. |
| 6,642,618 B2 | 11/2003 | Yagi et al. |
| 6,642,652 B2 | 11/2003 | Collins et al. |
| 6,844,903 B2 | 1/2005 | Mueller-Mach et al. |
| 6,869,812 B1 | 3/2005 | Liu |
| 6,891,203 B2 | 5/2005 | Kozawa et al. |
| 7,006,172 B2 | 2/2006 | Kawana et al. |
| 7,153,015 B2 | 12/2006 | Brukilacchio |
| 7,248,310 B2 | 7/2007 | Mueller-Mach |
| 7,311,858 B2 | 12/2007 | Wang et al. |
| 7,429,340 B2 | 9/2008 | Kwon |
| 7,479,662 B2 | 1/2009 | Soules et al. |
| 7,615,795 B2 | 11/2009 | Baretz et al. |
| 7,943,945 B2 | 5/2011 | Baretz et al. |
| 2001/0004108 A1 | 6/2001 | Iwamatsu et al. |
| 2001/0038424 A1 | 11/2001 | Kotani et al. |
| 2001/0038426 A1 | 11/2001 | Bechtel et al. |
| 2002/0063813 A1 | 5/2002 | Dirscherl et al. |
| 2002/0145685 A1 | 10/2002 | Mueller-Mach et al. |
| 2002/0167624 A1 | 11/2002 | Paolini et al. |
| 2004/0016938 A1 | 1/2004 | Baretz et al. |
| 2005/0073495 A1 | 4/2005 | Harbers et al. |
| 2005/0185125 A1 | 8/2005 | Miyachi et al. |
| 2005/0253114 A1 | 11/2005 | Setlur et al. |
| 2005/0264715 A1 | 12/2005 | Kahen et al. |
| 2006/0022208 A1 | 2/2006 | Kim et al. |
| 2006/0028122 A1 | 2/2006 | Wang et al. |
| 2006/0049416 A1 | 3/2006 | Baretz et al. |
| 2006/0065900 A1 | 3/2006 | Hsieh et al. |
| 2006/0111981 A1 | 5/2006 | Hunter |
| 2006/0238103 A1 | 10/2006 | Choi et al. |
| 2006/0238671 A1 | 10/2006 | Kim et al. |
| 2006/0244367 A1 | 11/2006 | Im et al. |
| 2007/0040097 A1 | 2/2007 | Mok et al. |
| 2007/0046176 A1* | 3/2007 | Bukesov ............... C09K 11/08 |
| | | 313/496 |
| 2007/0058106 A1 | 3/2007 | Kim et al. |
| 2007/0146584 A1 | 6/2007 | Wang et al. |
| 2007/0263408 A1 | 11/2007 | Chua |
| 2008/0048199 A1 | 2/2008 | Ng |
| 2008/0224597 A1 | 9/2008 | Baretz et al. |
| 2008/0224598 A1 | 9/2008 | Baretz et al. |
| 2009/0051853 A1 | 2/2009 | Thomas et al. |
| 2010/0015658 A1 | 1/2010 | Yang et al. |
| 2010/0079704 A1 | 4/2010 | Cho et al. |
| 2010/0264371 A1 | 10/2010 | Nick |
| 2013/0155723 A1* | 6/2013 | Coleman ............... G02B 6/0018 |
| | | 362/621 |
| 2015/0062490 A1* | 3/2015 | Kwon ............... G02F 1/133621 |
| | | 349/64 |

FOREIGN PATENT DOCUMENTS

| | | |
|---|---|---|
| CN | 101218621 A | 7/2008 |
| CN | 101788737 A | 7/2008 |
| CN | 102109697 A | 6/2011 |
| EP | 647694 | 4/1995 |
| EP | 1256835 A | 11/2002 |
| GB | 2017409 | 10/1979 |
| GB | 2170940 A | 8/1986 |
| JP | S5079379 | 11/1973 |
| JP | 60061725 A | 4/1985 |
| JP | 60170194 | 9/1985 |
| JP | 862189770 | 8/1987 |
| JP | H01179471 | 7/1989 |
| JP | 01230091 A | 9/1989 |
| JP | 01260707 | 10/1989 |
| JP | H0291980 | 3/1990 |
| JP | H324692 | 3/1991 |
| JP | 4010665 | 1/1992 |
| JP | 4010666 | 1/1992 |
| JP | 04289691 | 10/1992 |
| JP | 4321280 | 11/1992 |
| JP | 05152609 | 6/1993 |
| JP | 6207170 | 7/1994 |
| JP | 6267301 | 9/1994 |

(56) References Cited

FOREIGN PATENT DOCUMENTS

| | | |
|---|---|---|
| JP | 6283755 | 10/1994 |
| JP | 07099345 | 4/1995 |
| JP | H07176794 | 7/1995 |
| JP | 07235207 | 9/1995 |
| JP | H7282609 | 10/1995 |
| JP | H087614 | 1/1996 |
| JP | 8250281 | 9/1996 |
| JP | H1020109 A | 1/1998 |
| JP | 11007016 A | 1/1999 |
| JP | 2900928 | 3/1999 |
| JP | 2003043483 A | 2/2003 |
| JP | P2003234513 | 8/2003 |
| JP | 2003030019 A | 11/2003 |
| JP | 2004094039 A | 3/2004 |
| JP | 2005068269 A | 3/2005 |
| JP | P3724490 | 9/2005 |
| JP | P3724498 | 9/2005 |
| JP | 2006077153 A | 3/2006 |
| JP | 2006114290 A | 4/2006 |
| JP | 2007178902 A | 7/2007 |
| JP | 2007238712 A | 9/2007 |
| JP | 2008287073 A | 11/2008 |
| KR | 1998040607 | 8/1998 |
| KR | 100538104 B1 | 12/2005 |
| KR | 20100077968 A | 7/2010 |
| KR | 101005305 B1 | 1/2011 |
| TW | 200813549 A | 3/2008 |
| TW | 201341899 A | 10/2013 |
| WO | WO 9108508 | 6/1991 |
| WO | WO 2006022792 A2 | 3/2006 |
| WO | WO 2006108013 A2 | 10/2006 |

OTHER PUBLICATIONS

Adachi, C. et al., "Blue light-emitting organic electroluminescent devices", "Appl. Phys. Lett.", Feb. 26, 1990, pp. 799-801, vol. 56, No. 9.

Akasaki, Isamu, et al., "Photoluminescence of Mg-doped p-type GaN and electroluminescence of GaN p-n junction LED", "Journal of Luminescence", Jan.-Feb. 1991, pp. 666-670, vol. 48-49 pt. 2.

Amano, H., et al., "UV and blue electroluminescence from Al/GaN:Mg/GaN LED treated with low-energy electron beam irradiation (LEEBI)", "Institute of Physics: Conference Series", 1990, pp. 725-730, vol. 106, No. 10.

Apr. 14, 2010 Office Action in U.S. Appl. No. 11/264,124.

Apr. 15, 2009 Office Action in U.S. Appl. No. 11/264,124, issued by Abu I Kalam.

Armaroli, N. et al., "Supramolecular Photochemistry and Photophysics.", "J. Am. Chern. Soc.", 1994, pp. 5211-5217, vol. 116.

Aug. 21, 2006 Office Action in U.S. Appl. No. 10/623,198, issued by Thao X. Le.

Aug. 24, 2007 Office Action in U.S. Appl. No. 11/264,124, issued by Thao X. Le.

Aug. 26, 2010 Office Action in U.S. Appl. No. 12/131,118.

Berggren, M. et al., "Light-emitting diodes with variable colours from polymer blends", "Nature", Dec. 1, 1994, pp. 444-446, vol. 372.

Berggren, M., et al., "White light from an electroluminescent diode made from poly[3(4-octylphenyl)-2,2'-bithiophene] and an oxadiazole . . . ", "Journal of Applied Physics", Dec. 1994, pp. 7530-7534, vol. 76, No. 11.

Boonkosum, W. et al., "Novel Flat Panel display made of amorphous SiN:H/SiC:H thin film LED", "Physical Concepts and Materials for Novel Optoelectronic Device Applications II", 1993, pp. 40-51, vol. 1985.

Bradfield, P.L., et al., "Electroluminescence from sulfur impurities in a p-n junction formed in epitaxial silicon", "Appl. Phys. Lett", 07110/1989, pp. •10D-102, vol. 55, No. 2.

Chao, Zhang Jin, et al., "White light emitting glasses", "Journal of Solid State Chemistry", 1991, pp. 17-29, vol. 93.

Comrie, M. , "Full Color LED Added to Lumex's Lineup", "EBN", Jun. 19, 1995, p. 28.

CRC Handbook, 63rd Ed., (1983) p. E-201.

Das, N.C., et al., "Luminescence spectra of ann-channel metal-oxide-semiconductor field-effect transistor at breakdown", 1990, pp. 1152-1153, vol. 56, No. 12.

Dec. 16, 2004 Office Action in U.S. Appl. No. 10/623,198, issued by Thao X. Le.

Dictionary Definition of Phosphor, Oxford English Dictionary Online, Mar. 9, 2012 (Only partial available due to corrupt file on Mar. 22, 2012 in U.S. Appl. No. 12/131,119; Request for Full Reference filed).

El Jouhari, N., et al., "White light generation using fluorescent glasses activated by Ce3+, Tb3+ and Mn2+ ions", "Journal De Physique IV, Colloque C2", Oct. 1992, pp. 257-260, vol. 2.

Fantini, Sergio, et al. "Quantitative determination of the absorption spectra of chromophores in strongly scattering media: a light-emitting-diode based technique." *Applied optics* 33.22 (1994): 5204-5213.

Feb. 21, 2012 Office Action in U.S. Appl. No. 12/131,118, issued by Abul Kalam.

Feb. 26, 2008 Office Action in U.S. Appl. No. 11/264,124, issued by Abu I Kalam.

Feb. 4, 2005 Office Action in U.S. Appl. No. 10/623,198, issued by Thao X. Le.

Feb. 7, 2007 Office Action in U.S. Appl. No. 11/264,124, issued by Thao X. Le.

Forrest, S. et al. , "Organic emitters promise a new generation of displays", "Laser Focus World", Feb. 1995, pp. 99-107.

Graford, G., "LEDs Challenge the Incandescents," Circuits and Devices, vol. 8, No. 5, pp. 24-29 (Sep. 1992).

Hamada, Y. et al. , "Blue-Light-Emitting Organic Electroluminescent Devices with Oxadiazole Dimer Dyes as an Emitter", "Jpn. J. Appl. Physics", Jun. 1992, pp. 1812-1816, vol. 31.

Hamakawa, Yoshihiro, et al., "Toward a visible light display by amorphous SiC:H alloy system", "Optoelectronics—Devices and Technologies", Dec. 1989, pp. 281-294, vol. 4, No. 2.

Hirano, Masao, et al., "Various performances of fiber-optical temperature sensor utilizing infrared-to-visible conversion phosphor", "Electrochemisty (JP)", Feb. 1987, pp. 158-164, vol. 55, No. 2, Publisher: Electrochemical Society of Japan.

Jang, S., "Effect of Avalanche-Induced Light Emission on the Multiplication Factor in Bipolar Junction Transistors", "Solid-State Electronics", 1991, pp. 1191-1196, vol. 34, No. 11.

Jan. 29, 2007 Office Action in U.S. Appl. No. 10/623,198, issued by Thao X. Le.

Jan. 30, 2006 Office Action in U.S. Appl. No. 11/264,124, issued by Thao X. Le.

Jan. 7, 2011 Office Action in U.S. Appl. No. 12/131,119, issued by Steven Y. Horikoshi.

Jul. 10, 2008 Office Action in U.S. Appl. No. 11/264,124, issued by Abu I Kalam.

Jul. 14, 2005 Notice of Allowance, Notice of Allowability, and Examiner's Statement of Reasons for Allowance in U.S. Appl. No. 10/623,198, issued by Thao X. Le.

Jul. 14, 2011 Office Action in U.S. Appl. No. 12/131,119, issued by Steve Horikoshi.

Jul. 7, 2011 Office Action in U.S. Appl. No. 12/131,118, issued by Abu I Kalam.

Jun. 14, 2006 Office Action in U.S. Appl. No. 11/264,124, issued by Thao X. Le.

Jun. 26, 2007 Office Action in U.S. Appl. No. 10/623,198, issued by Thao X. Le.

Kido, J. et al. , "1,2,4-Triazole Derivative as an Electron Transport Layer in Organic Luminescent Devices", "Jpn. J. Appl. Phys.", Jul. 1, 1993, pp. L917-L920, vol. 32.

Kido, J. et al. , "Bright blue electroluminescence from poly(N-vinylcarbazole)", "Appl. Phys. Letters", Nov. 8, 1993, pp. 2627-2629, vol. 63, No. 19.

Kido, J., et al., "White light-emitting organic electroluminescent devices using the poly(N-vinylcarbazole) emitter layer doped with . . . ", "Appl. Phys. Lett.", Feb. 14, 1994, pp. 815-817, vol. 64, No. 7.

(56) References Cited

OTHER PUBLICATIONS

Krames, M., et al., "Status and Future of High-Power Light-Emitting Diodes for Solid-State Lighting", "Journal of Display Technology", Jun. 2007, pp. 160-175, vol. 3, No. 2.
Kudryashov, V., et al., "Spectra of Superbright Blue and Green InGaN/AlGaN/GaN Light-Emitting diodes", "Journal of the European Ceramic Society", May 1996, pp. 2033-2037, vol. 17.
Larach, S., et al., "Blue emitting luminescent phosphors: Review and status", "Int'l Workshop on Electroluminescence", 1990, pp. 137-143.
LEDs and Laser Diodes, Electus Distribution, copyright 2001, available at URL:http://www.jaycar.com.au/images_uploaded/ledlaser.Pdf.
Lester, S., et al., "High dislocation densities in high efficiency GaN-based light-emitting diodes", "Appl. Phys. Lett.", Mar. 6, 1995, pp. 1249-1251, vol. 66, No. 10.
Lumogen® F Violet 570 Data Sheet; available at the BASF Chemical Company website Lumogen® F Violet 570 Data Sheet; available at the BASF Chemical Company website URL,http://worldaccount.basf.com/wa/EUen_GB/Catalog/Pigments/doc4/BASF/PRD/30048274/.pdt?title=Technicai%20Datasheet&asset_type=pds/pdf&language=EN&urn=urn: documentum:eCommerce_soi_EU :09007bb280021e27.pdf :09007bb280021e27.pdf.
Mar. 2, 2009 Office Action in U.S. Appl. No. 10/623,198, issued by Abu I Kalam.
Mar. 22, 2012 Office Action in U.S. Appl. No. 12/131,119, issued by Steven Y. Horikoshi.
Mar. 28, 2006 Office Action in U.S. Appl. No. 10/623,198, issued by Thao X. Le.
Mar. 4, 2011 Notice of Allowance, Notice of Allowability, Examiner's Interview Summary, Examiner's Amendment/Comment and Examiner's Statement of Reason for Allowance in U.S. Appl. No. 11/264,124, issued by Abu I Kalam.
Mar. 7, 2008 Office Action in U.S. Appl. No. 10/623,198, issued by Abu I Kalam.
Maruska, H.P., "Gallium nitride light-emitting diodes (dissertation)", "Dissertation Submitted to Stanford University", Nov. 1973.
Maruska, H.P., et al., "Violet luminescence of Mg-doped GaN", "Appl. Phys. Lett.", Mar. 15, 1973, pp. 303-305, vol. 22, No. 6.
May 4, 2010 Office Action in U.S. Appl. No. 12/131,119.
Mcgraw-Hill, "McGraw-Hill Dictionary of Scientific and Technical Terms, Third Edition", "McGraw-Hill Dictionary of Scientific and Technical Terms", 1984, pp. 912 and 1446, Publisher: McGraw-Hill.
Mcgraw-Hill, "McGraw-Hill Encyclopedia of Science and Technology, Sixth Edition", "McGraw-Hill Encyclopedia of Science and Technology", 1987, pp. 582 and 60-63, vol. 9-10, Publisher: McGraw-Hill.
Mimura, Hidenori, et al., "Visible electroluminescence from uc-SiC/porous Si/c-Si p-n junctions", "Int. J. Optoelectron.", 1994, pp. 211-215, vol. 9, No. 2.
Miura, Noboru, et al., "Several Blue-Emitting Thin-Film Electroluminescent Devices", "Jpn. J. Appl. Phys.", Jan. 15, 1992, pp. L46-L48, vol. 31, No. Part 2, No. 1A IB.
Morkoc et al., "Large-band-gap SIC, 111-V nitride, and II-VI ZnSe-based semiconductor device technologies", J. Appl. Phys. 76(3), 1; Mar. 17, 1994; Illinois University.
Muench, W.V., et al., "Silicon carbide light-emitting diodes with epitaxial junctions", "Solid-State Electronics", Oct. 1976, pp. 871-874, vol. 19, No. 10.
Mukai, T., et al., "Recent progress of nitride-based light emitting devices", "Phys. Stat. Sol.", Sep. 2003, pp. 52-57, vol. 200, No. 1.
Nakamura, S., et al., "High-power InGaN single-quantum-well-structure blue and violet light-emitting diodes", "Appl. Phys. Lett.", Sep. 25, 1995, pp. 1868-1870, vol. 67, No. 13.
Nakamura, S., et al., "The Blue Laser Diode: GaN Based Light Emitters and Lasers", Mar. 21, 1997, p. 239, Publisher: Springer-Verlag.
Nakamura, S., et al., "The Blue Laser Diode: The Complete Story, 2nd Revised and Enlarged Edition", Oct. 2000, pp. 237-240, Publisher: Springer-Verlag.
Nov. 30, 2010 Office Action in U.S. Appl. No. 12/131,118.
Oct. 20, 2008 Office Action in U.S. Appl. No. 10/623,198, issued by Abu I Kalam.
Pankove, J., "Luminescence in GaN," Journal of Luminescence, vol. 7, pp. 114-126 (1973).
Pankove, J.I., et al., "Scanning electron microscopy studies of GaN", "Journal of Applied Physics", Apr. 1975, pp. 1647-1652, vol. 46, No. 4.
Pavan, P., et al., "Explanation of Current Crowding Phenomena Induced by Impact Ionization in Advanced Si Bipolar Transistors by Means of . . . ", "Microelectronic Engineering", 1992, pp. 699-702, vol. 19.
Pei, Q, et al., "Polymer Light-Emitting Electrochemical Cells", "Science", Aug. 25, 1995, pp. 1086-1088, vol. 269, No. 5227.
Reexam Advisory Action dated Sep. 28, 2012 for U.S. Appl. No. 90/010,940.
Reexam Final Office Action dated May 24, 2012 for U.S. Appl. No. 90/010,940.
Reexam Final Office Action dated Nov. 7, 2011 for U.S. Appl. No. 90/010,940.
Reexam Non-Final Office Action dated Jan. 26, 2012 for U.S. Appl. No. 90/010,940.
Reexam Non-Final Office Action dated Mar. 3, 2011 for U.S. Appl. No. 90/010,940.
Reexam Non-Final Office Action dated Sep. 20, 2010 for U.S. Appl. No. 90/010,940.
Roman. D., "LEDs Turn a Brighter Blue", "Electronic Buyers' News", Jun. 19, 1995, pp. 28 and 35, vol. 960, Publisher: CMP Media LLC.
Saleh and Teich, Fundamentals of Photonics, New York: John Wiley & Sons, 1991, pp. 592-594.
Sato, Yuichi, et al., "Full-color fluorescent display devices using a near-UV light-emitting diode", "Japanese Journal of Applied Physics", Jul. 1996, pp. L838-L839, vol. 35, No. ?A.
Sep. 17, 2009 Notice of Allowance, Notice of Allowability, Examiner's Amendmeni/Comment, and Examiner's Statement of Reasons for Allowance in U.S. Appl. No. 10/623,198, issued by Abul Kalam.
Sep. 29, 2009 Office Action in U.S. Appl. No. 11/264,124, issued by Abu I Kalam.
Strite, S. et al., "GaN, AlN, and InN: a review," J. Vac. Sci. Technol. B., vol. 10, No. 4, pp. 1237-1266 (Jul./Aug. 1992).
Tanaka, Shosaku, et al., "Bright white-light electroluminescence based on nonradiative energy transfer in Ce- and Eu-doped SrS thin films", "Applied Physics Letters", Nov. 23, 1987, pp. 1661-1663, vol. 51, No. 21.
Tanaka, Shosaku, et al., "White Light Emitting Thin-Film Electroluminescent Devices with SrS:Ce,Cl/ZnS:Mn Double Phosphor Layers", "Jpn. J. Appl. Phys.", Mar. 20, 1986, pp. L225-L227, vol. 25, No. 3.
The Penguin Dictionary of Electronics, 3rd edition, pp. 315,437-438, 509-510, copyright 1979, 1988, and 1998.
Ura, M. , "Recent trends of development of silicon monocarbide blue-light emission diodes", "Kinzoku", 1989, pp. 11-15, vol. 59, No. 9.
Werner, K. , "Higher Visibility for LEDs", "IEEE Spectrum", Jul. 1994, pp. 30-39.
Wojciechowski, J. et al. , "Infrared-To-Blue Up-Converting Phosphor", "Electron Technology", 1978, pp. 31-47, vol. 11, No. 3.
Yamaguchi, Y. et al., "High-Brightness SiC Blue LEDs and Their Application to Full Color LED Lamps", "Optoelectronics—Devices and Technologies", Jun. 1992, pp. 57-67, vol. 7, No. 1.
Yang, Y., et al., "Voltage controlled two color light-emitting electrochemical cells", "Appl. Phys. Lett.", 1996, vol. 68, No. 19.
Yoshimi, Masashi, et al., "Amorphous carbon basis blue light electroluminescent device", "Optoelectronics—Devices and Technologies", Jun. 1992, pp. 69-81, vol. 7, No. 1.
Zanoni, E., et al., "Impact ionization, recombination, and visible light emission in ALGaAs/GaAs high electron mobility transistors", "J. Appl. Phys.", 1991, pp. 529-531, vol. 70, No. 1.

(56) References Cited

OTHER PUBLICATIONS

Zanoni, E., et al., "Measurements of Avalanche Effects and Light Emission in Advanced Si and SiGe Bipolar Transistors", "Microelectronic Engineering", 1991, pp. 23-26, vol. 15.
Zdanowski, Marek, "Pulse operating up-converting phosphor LED", "Electron Technol.", 1978, pp. 49-61, vol. 11, No. 3.
Zhiming, Chen, et al., "Amorphous thin film white-LED and its light-emitting mechanism", "Conference Record of the 1991 International Display Research Conference", Oct. 1991, pp. 122-125.
Final Office Action dated Jun. 2, 2014 for U.S. Appl. No. 13/403,854.
Non-Final Office Action dated Jan. 9, 2013 for U.S. Appl. No. 13/403,854.
Notice of Allowance dated Sep. 15, 2014 for U.S. Appl. No. 13/403,854.
Chinese Office Action and English Translation dated Apr. 1, 2011 for Chinese Appln. No. 200780025601.6.
Chinese Office Action and English Translation dated Apr. 2, 2010 for Chinese Appln. No. 200780025601.6.
Chinese Office Action and English Translation dated Mar. 16, 2012 for Chinese Appln. No. 200780025601.6.
Chinese Office Action dated Apr. 1, 2013 for Chinese Appln. No. 200780025601.6.
Foreign Office Action and English Translation dated Jun. 2, 2010 for European Appln. No. 7835992.4.
Foreign Office Action and English Translation dated Nov. 17, 2010 for European Appln. No. 7835992.4.
Search Report dated Mar. 9, 2010 for EP Appln. No. 7835992.4.
Foreign Office Action and English Translation dated May 11, 2010 for Japanese Appln. No. 2009-518374.
Foreign Office Action and English Translation dated Sep. 6, 2011 for Japanese Appln. No. 2009-518374.
Appeal Decision dated Jan. 15, 2013 for Japanese Appln. No. 2009-518374.
Written Questioning and English Translation dated Jun. 19, 2012 for Japanese Appln. No. 2009-518374.
Foreign Office Action and English Translation dated Feb. 17, 2011 for Korean Appln. No. 10-2009-7002518.
Foreign Office Action and English Translation dated Feb. 24, 2012 for Korean Appln. No. 10-2009-7002518.
Foreign Office Action and English Translation dated Aug. 11, 2011 for Tawian Appln. No. 96124790.
Final Office Action dated Jun. 22, 2012 for U.S. Appl. No. 11/824,979.
Final Office Action dated Mar. 2, 2011 for U.S. Appl. No. 11/824,979.
Final Office Action dated May 20, 2013 for U.S. Appl. No. 11/824,979.
Non-Final Office Action dated Apr. 30, 2009 for U.S. Appl. No. 11/824,979.
Non-Final Office Action dated Aug. 5, 2010 for U.S. Appl. No. 11/824,979.
Non-Final Office Action dated Jan. 8, 2010 for U.S. Appl. No. 11/824,979.
Non-Final Office Action dated Sep. 28, 2011 for U.S. Appl. No. 11/824,979.
Ex-Parte Quayle Action dated Jul. 19, 2012 for U.S. Appl. No. 11/906,540.
Non-Final Office Action dated Mar. 15, 2013 for U.S. Appl. No. 11/906,540.
Non-Final Office Action dated Oct. 26, 2011 for U.S. Appl. No. 11/906,540.
International Search Report dated May 30, 2013 for PCT Appln. No. PCT/US13/26256.
International Search Report and Written Opinion dated Jan. 28, 2008 for International Application No. PCT/US2007/015515.
Kang H. et al., "Eu-doped barium strontium silicate phosphor particles prepared from spray solution containing NH4Cl flux by spray pyrolysis," Materials Science and Engineering B, Elsevier Sequoia, Lausanne, Switzerland, vol. 121, No. 1-2, Jul. 25, 2005, pp. 81-85.
Kasei Optonix, Ltd., http://www.kasei-optonix.co.jp/english/products/phosphor/lamp.html, Aug. 24, 2007.
Foreign Office Action dated Mar. 13, 2017 for Chinese Appln. No. 201380010907.
Search Report dated Aug. 22, 2016 for EP Appln. No. 151801649.
Foreign Office Action dated Jan. 19, 2017 for Chinese Appln. No. 105109106.
Foreign Office Action dated Aug. 15, 2017 for Chinese Appln. No. 106118882.

* cited by examiner

PHOTOLUMINESCENCE COLOR DISPLAY

CROSS REFERENCE TO RELATED APPLICATIONS

This application claims the benefit of priority to U.S. Provisional Application No. 62/137,195 filed 23 Mar. 2015, entitled "Photoluminescence Color Display" which is hereby incorporated by reference in its entirety.

BACKGROUND OF THE INVENTION

Field of the Invention

The invention relates to color displays, such as liquid crystal displays (LCDs), which convert electrical signals into color images. In particular, the invention concerns color, transmissive displays in which photoluminescence materials are used to generate color light in response to excitation radiation from a backlight, such displays being termed photoluminescence color displays or photoluminescent color displays.

Description of the Related Art

Light that allows us to see comes from solar energy in what is known as the visible region of the solar, electromagnetic, spectrum. This region is a very narrow segment of the total spectrum, the visible region being that portion visible to the human eye. It ranges in wavelength from about 440 nm in the extreme blue or near ultraviolet to about 690 nm in the red or near infrared. The middle of the visible region is a green color at about 555 nm. Human vision is such that what appears as white light is really composed of weighted amounts of a continuum of so-called black body radiation. In order to produce light that appears "white" to a human observer, the light needs to have component weights of about 30 percent in the red (R), 59 percent in the green (G) and 11 percent in the blue (B).

The perception of light as being white can be maintained even when the amount of one of the RGB component colors is changed, as long as the amounts of the other two can be adjusted to compensate. For example, if the red light source is shifted to a longer wavelength, the white light will appear more cyan in color if the other two colors remain unchanged. White balance may be restored, however, by changing the weight of the green and blue to levels other than their original values of 11 and 59 percent, respectively. The human eye does not have the ability to resolve closely spaced colors into the individual red, green, and blue (RGB) primary components of white light, since the human vision system mixes these three components to form intermediates. The reader will recall that human vision registers (and/or detects) only the three primary colors, and all other colors are perceived as combinations of these primaries.

Color liquid crystal displays (LCDs) in use today are based on picture elements, or "pixels," formed by a matrix/array of liquid crystal (LC) cells. As is known, the intensity of the light passing through a LC can be controlled by changing the angle of polarization of the light in response to an electrical field, voltage, applied across the LC. For a color LCD, each pixel is actually composed of three "sub-pixels": one red (R), one green (G), and one blue (B). Taken together, this sub-pixel triplet makes up what is referred to as a single pixel (pixel unit). What the human eye perceives as a single white pixel is actually a triplet of RGB sub-pixels with weighted intensities such that each of the three sub-pixels appears to have the same brightness. Likewise, when the human eye sees a solid white line, what is actually being displayed is a series or line of RGB triplets. The multi-sub-pixel arrangement may be manipulated by tuning the photometric output of the light source to a set of desired color coordinates, thereby offering a superior Color Rendering Index (CRI) and a dynamic color selection for a large color palette.

In current color, transmissive LCD technology, this color tuning is implemented with the use of color filters. The principle of operation of a conventional color, transmissive LCD is based upon a bright white light backlighting source located behind a liquid crystal (LC) matrix, and a panel of color filters positioned on an opposite side of the liquid crystal matrix. The liquid crystal matrix is digitally switched to adjust the intensity of the white light from the backlighting source reaching each of the color filters of each pixel, thereby controlling the amount of colored light transmitted by the RGB sub-pixels. Light exiting the color filters generates the color image.

A typical LCD structure is sandwich-like in which the liquid crystal is provided between two glass panels; one glass panel containing the switching elements that control the voltage being applied across electrodes of the LC corresponding to respective sub-pixel, and the other glass panel containing the color filters. The switching elements for controlling the LC matrix which are located on the back of the structure, that is facing the backlighting source; typically comprise an array of thin film transistors (TFTs) in which a respective TFT is provided for each sub-pixel. The color filter glass panel is a glass plate with a set of primary (red, green, and blue) color filters grouped together. Light exits the color filter glass panel to form the image.

As is known, LCs have the property of rotating the plane of polarization of light as a function of the applied electric field, voltage. Through the use of polarizing filters and by controlling the degree of rotation of the polarization of the light as a function of the voltage applied across the LC the amount of white light supplied by the backlighting source to the filters is controlled for each red, green and blue sub-pixel. The light transmitted through the filters generates a range of colors for producing images that viewers see on a TV screen or computer monitor.

Typically, the white light source used for backlighting comprises a mercury-filled cold cathode fluorescent lamp (CCFL). CCFL tubes are typically glass, and filled with inert gases. The gases ionize when a voltage is applied across electrodes positioned within the tube, and the ionized gas produces ultraviolet (UV) light. In turn, the UV light excites one or more phosphors coated on the inside of the glass tube, generating visible light. Reflectors redirect the visible light to the monitor and spread it as uniformly as possible, backlighting the thin, flat LCD. The backlight itself has always defined the color temperature and color space available, which has typically been approximately 75 percent of NTSC (National Television Standards Committee) requirements.

In the known LCD systems, the color filter is a key component for sharpening the color of the LCD. The color filter of a thin film transistor liquid crystal display (TFT LCD) consists of three primary colors (RGB) which are included on a color filter plate. The structure of the color filter plate comprises a black (opaque) matrix and a resin film, the resin film containing three primary-color dyes or pigments. The elements of the color filter line up in one-to-one correspondence with the unit pixels on the TFT-arrayed glass plate. Since the sub-pixels in a unit pixel are too small to be distinguished independently, the RGB elements appear to the human eye as a mixture of the three colors. As a result, any color, with some qualifications, can be produced by mixing these three primary colors.

The development over recent years of high brightness light emitting diodes (LEDs) has made possible LED backlighting with an enhanced color spectrum and has been used to provide a wider range of spectral colors for displays. In addition, LED backlighting has allowed for a tuning of the white point, when allied with a feedback sensor, ensuring the display operates consistently to a pre-defined performance.

In these LED based backlighting systems, the light output from red, green and blue (RGB) LEDs is mixed in equal proportions to create white light. This approach, unfortunately, requires complex driving circuitry to properly control the intensities of the three different color LEDs since different circuitry is necessary because each of the LEDs demands different drive conditions.

An alternative approach has been to use a white emitting LED which comprises a single blue LED chip coated with a yellow fluorescent phosphor; the yellow phosphor absorbing a proportion of the blue light emitted by the blue LED, and then re-emitting that light (in a process known as down-conversion) as yellow light. By mixing the yellow light generated by the yellow phosphor with the blue light from the blue LED, white light over the entire visible spectrum could be produced. Alternatively, an ultraviolet LED can be coated with a red-green-blue phosphor to produce white light; in this case, the energy from the ultraviolet LED is substantially non-visible, and since it cannot contribute a component to the resultant white light, it functions only as an excitation source for the phosphors. Unfortunately, the white light product of such LEDs does not match well with the color filters used in current LCDs, and a significant amount of the backlight intensity is wasted.

U.S. Pat. No. 4,830,469 proposes a LCD which uses UV light to excite red, green and blue light emitting phosphor sub-pixels thereby eliminating the need for RGB color filters. Such LCDs are referred to as photoluminescence color LCDs. A mercury lamp emitting UV light of wavelength 360 nm to 370 nm is used as a backlight and the red, green and blue emitting phosphors are provided on a front substrate plate. The UV light after being modulated by the liquid crystal matrix is then incident on the phosphor sub-pixels of the front plate which emit red, green and blue light in response.

U.S. Pat. No. 6,844,903 teaches a color, transmissive LCD which supplies a uniform blue light of wavelength 460 nm to the back of the liquid crystal layer. The blue light, after being modulated by the liquid crystal layer, is then incident on the back surface of phosphor material located above the liquid crystal layer. A first phosphor material, when irradiated with the blue light, generates red light for the red pixel areas of the display, and a second phosphor material, when irradiated with the blue light, generates green light for the green pixel areas of the display. No phosphor material is deposited over the blue sub-pixel areas since blue light is provided from the backlight. A suitable diffuser (e.g. scattering powder) can be located at the blue sub-pixel areas so that the blue pixels match the viewing angle properties of the red and green pixels.

United States Patent Applications US 2006/0238103 and US 2006/0244367 teach photoluminescence color LCDs which respectively use UV light of wavelength 360 nm to 460 nm and a near blue-UV light of wavelength 390 nm to 410 nm to excite red, green and blue light emitting phosphor sub-pixels. The use of near blue-UV backlighting reduces deterioration of liquid crystals caused by UV light.

A further example of a photoluminescence color LCD is disclosed in Japanese patent application JP 2004094039.

U.S. Pat. No. 8,947,619 discloses a photoluminescence color display comprising a photoluminescence color-elements plate having red, green or blue quantum dots material corresponding to the pixel areas of the display; and a wavelength selective filter disposed between the color-elements plate and the excitation source. The wavelength selective filter prevents light generated within the pixel areas returning to the excitation source.

The present invention concerns photoluminescence color display, which utilizes photoluminescence materials, such as quantum dots, inorganic and organic phosphor materials, to generate the different colors of light of the sub-pixels. What is needed in the art is a color display that uses an RGB photoluminescence based color rendering scheme to sharpen the color and enhance the brightness of the image.

SUMMARY OF THE INVENTION

Embodiments of the present invention are directed to low-cost, high energy conversion efficiency color displays, such as LCDs, having enhanced color rendering. Color displays in accordance with embodiments of the invention enable images with a high brightness and a spectacular, vivid range of colors to be realized. Such enhanced color display have applications in a variety of electronics devices including, but not limited to, televisions, monitors and computer monitors, the view screens of satellite navigation systems and hand-held devices such as mobile telephones and personal video/music systems.

A photoluminescence color display can comprise a display panel that displays red, green and blue sub-pixel areas, an excitation source operable to generate excitation radiation for operating the display, and a combined layer. The combined layer (that is operable to emit light corresponding to red, green or blue sub-pixel areas of the display) comprises a mixture of at least one photoluminescence material and a color filter pigment having specific optical properties for enhancing the performance of the display.

According to an aspect of the present invention, there is provided a photoluminescence color display comprising: a display panel comprising a plurality of red, green and blue sub-pixel areas; and an excitation source operable to generate blue light for operating the display; wherein said red sub-pixel areas comprise a mixture of a first photoluminescence material that is operable to emit red light in response to said blue excitation light and a first color filter pigment that allows the passage of blue light and red light whilst substantially preventing the passage of green light; said green sub-pixel areas comprise a mixture of a second photoluminescence material that is operable to emit green light in response to said excitation radiation and a second color filter pigment that allows the passage of blue light and green light whilst preventing the passage of red light; and said blue sub-pixel areas comprise a third color filter pigment that allows the passage of blue light whilst preventing the passage of red light and green light.

A photoluminescence color display formed in accordance with the invention addresses the problem of reducing and/or eliminating "cross-talk" between different sub-pixels and sharpens the color of the display. In the context of this patent specification, cross-talk refers to the emission of light from a sub-pixel which has a color which does not correspond to that of said sub-pixel. Cross-talk includes, for example, the emission of red light from green or blue sub-pixels; the emission of green light from red or blue sub-pixels; and the emission of blue light from red or green sub-pixels. Since the photoluminescence process is isotropic, photoluminescence generated light is emitted in all directions including those back towards the excitation source. Since the excitation source is common to all sub-pixels, such light could then be emitted from sub-pixels of a different color and, if unchecked, this would degrade the display's performance. It is the inclusion of the color filter pigment with the photoluminescence materials with a specific optical characteristic that blocks the emission of light that does not correspond to the color of the sub-pixel.

Further, the inclusion of a color filter pigment having specific characteristics with the photoluminescence material further eliminates the need for a separate color filter plate to sharpen the color of the display. This reduces cost and improves efficiency of manufacture. Since a color filter plate is not required, it is not necessary to accurately align said color filter plate with the combined layer such that the sub-pixels of the filter plate accurately overlay corresponding sub-pixels of the combined layer, thereby improving efficiency of manufacture. For instance, in a 1080p display (1920×1080 pixels) this would require aligning 2,073,600 red, green and blue sub-pixels which would have a significant effect on the time and cost of manufacture.

It may be that the first color filter pigment is magenta. The inclusion of a magenta filter pigment in the red sub-pixels prevents green light from being emitted from red sub-pixels.

It may be that the second color filter pigment is cyan. Similarly, the inclusion of a cyan filter pigment in the green sub-pixels prevents red light from being emitted from green sub-pixels.

It may be that the third color filter pigment is blue. The inclusion of a blue filter pigment in the blue sub-pixels prevents red and green light from being emitted from blue sub-pixels. Hence, a photoluminescence material is typically not required in the blue sub-pixel area. In some embodiments, a blue photoluminescence may be used to convert the wavelength of the blue excitation light to blue light of a required wavelength.

The photoluminescence materials may comprise an inorganic or organic phosphor material, or quantum dots materials. The photoluminescence materials may comprise cadmium free quantum dots. The photoluminescence materials may comprise quantum dots materials which comprise materials selected from the group consisting of: cadmium selenide (CdSe); cadmium zinc selenide ($Cd_xZn_{1-x}Se$); cadmium zinc selenide sulfide (CdZnSeS); cadmium selenide sulfide ($CdSe_xS_{1-x}$); cadmium telluride (CdTe); cadmium telluride sulfide ($CdTe_xS_{1-x}$), cadmium sulfide (CdS), cadmium zinc sulfide ($Cd_xZn_{1-x}S$); indium phosphide (InP); indium gallium phosphide ($In_xGa_{1-x}P$); indium arsenide (InAs); copper indium sulfide ($CuInS_2$); copper indium selenide ($CuInSe_2$); copper indium sulfide selenide ($CuInS_xSe_{2-x}$); copper indium gallium sulfide ($CuIn_xGa_{1-x}S_2$); copper indium gallium selenide ($CuIn_xGa_{1-x}Se_2$); copper gallium sulfide ($CuGaS_2$); copper indium aluminum selenide ($CuIn_xAl_{1-x}Se_2$); copper gallium aluminum selenide ($CuGa_xAl_{1-x}Se_2$); copper indium sulfide zinc sulfide ($CuInS_{2x}ZnS_{1-x}$); and copper indium selenide zinc selenide ($CuInSe_{2x}ZnSe_{1-x}$). The quantum dots materials can comprise core/shell nano-crystals containing different materials in an onion-like structure. The quantum dots materials can be deposited as a thin layer of quantum dots directly on a substrate using a deposition method such as a contact printing process.

The photoluminescence color display may further comprise a liquid crystal disposed between front and back plates of the display panel; and a matrix of electrodes defining red, green and blue sub-pixel areas of the display and operable to selectively induce an electric field across the liquid crystal in the sub-pixel areas for controlling transmission of light through the sub-pixels areas.

The photoluminescence materials may be located on a face of the back plate; for instance, either a lower face or an upper face of the back plate. Alternatively, the photoluminescence materials may be located on a face of the front plate; for instance, either a lower face or an upper face of the front plate. Since the degree of polarization of light induced by a liquid crystal can depend on the wavelength of light, locating the photoluminescence material on the front plate may be advantageous in operating the red, green and blue sub-pixels.

The blue excitation light may have a peak emission wavelength in a range of 400 nm to 480 nm.

It may be that the red, green and blue sub-pixel areas comprise a combined layer of said photoluminescence materials and color filter pigments. The photoluminescence color display may further comprise polarizing layers and wherein the combined layer is located outside of the polarizing layers. The color display can further comprise a first polarizing filter layer on the front plate and a second polarizing filter layer on the back plate and wherein the orientation of the direction of polarization of the first polarizing filter layer is perpendicular to the direction of polarization of the second polarizing filter layer.

BRIEF DESCRIPTION OF THE DRAWINGS

In order that the present invention is better understood, embodiments of the invention will now be described, by way of example only, with reference to the accompanying drawings in which.

DETAILED DESCRIPTION OF THE INVENTION

Figure 1:
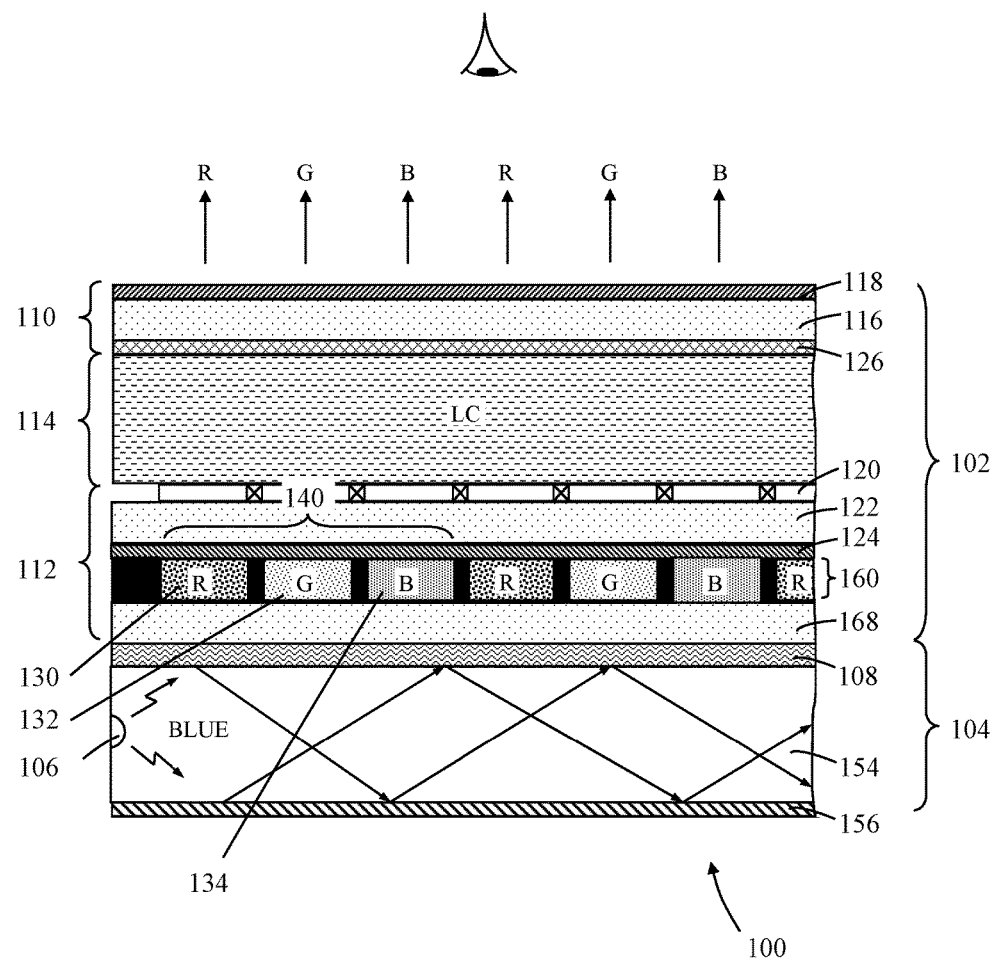
FIG. 1 is a schematic of a photoluminescence color LCD formed in accordance with an embodiment of the present invention.

Disclosed herein is a novel color rendering scheme designed to improve and enhance the brightness and sharpness of an electronic display, such as a liquid crystal display (LCD).

The present invention addresses the problem of reducing and/or eliminating cross-talk between different color sub-pixels in a photoluminescence color display. In accordance with embodiments of the present invention, sub-pixels of the display comprise a mixture of a photoluminescence material and a color filter pigment to at least in part reduce cross-talk, thereby sharpening the color of the display.

Throughout this specification like reference numerals are used to denote like features.

Referring to FIG. 1 there is shown a schematic cross-sectional representation of a photoluminescence color LCD 100 formed in accordance with an embodiment of the present invention. The LCD 100 comprises a display panel 102 and a backlighting unit 104.

The backlighting unit 104 comprises a planar light guide (waveguide) 154 with one or more blue light excitation sources 106 located along one or more edges of the light guide 154. Each excitation source 106 can comprise a blue light emitting LED (400 nm to 480 nm). In operation, excitation light is coupled into the edge(s) of the light guide 154 and is guided, by total internal reflection, over the entire volume of the light guide 154 to give a uniform illumination over the entire surface of the display panel 102. As shown and to prevent the escape of light from the backlighting unit 104, the rear of the light guide 154 can further comprise a light reflective surface 156. The blue light excitation sources 106 are operable to excite red and green photoluminescence sub-pixels 130, 132 respectively. The backlighting unit 104 may further comprise a light diffusing plane 108 to ensure the display panel 104 is substantially evenly irradiated with excitation radiation over its entire surface.

The display panel 102 comprises a transparent (light transmissive) front (light/image emitting) plate 110, a transparent back plate 112 and a liquid crystal (LC) 114 filling the volume between the front and back plates. The front plate 110 comprises a glass plate 116 having on its underside, that is the face of the plate facing the LC 114, a transparent common electrode plane 126 (for example transparent indium tin oxide, ITO). On the upper surface of the front plate 110 is a first polarizing filter layer 118. The back plate 112 comprises a glass plate 122 having on its underside, that is the face of the plate facing a combined layer 160, a second polarizing filter layer 124. On the upper surface of the back plate 112, that is the face of the plate facing the LC 114, is a thin film transistor (TFT) layer 120.

The combined layer 160 comprises an array of different color sub-pixels 130, 132, 134 which emit red (R), green (G), and blue (B) light respectively. The TFT layer 120 comprises an array of TFTs, wherein there is a transistor corresponding to each individual color sub-pixel 130, 132, 134 of each pixel unit 140 of the combined layer 160. Typically, the directions of polarization of the two polarizing filters 118, 124 are aligned perpendicular to one another.

The combined layer 160 comprises a mixture of photoluminescence materials and color filter pigments having specific characteristics that are coated on a glass (or plastic) substrate 168. By positioning the combined layer 160 outside of the polarizing layers 118 and 124, this prevents the random polarization of photoluminescence material (e.g., quantum dots) emissions interfering with operation of the LCD module.

Figure 2:
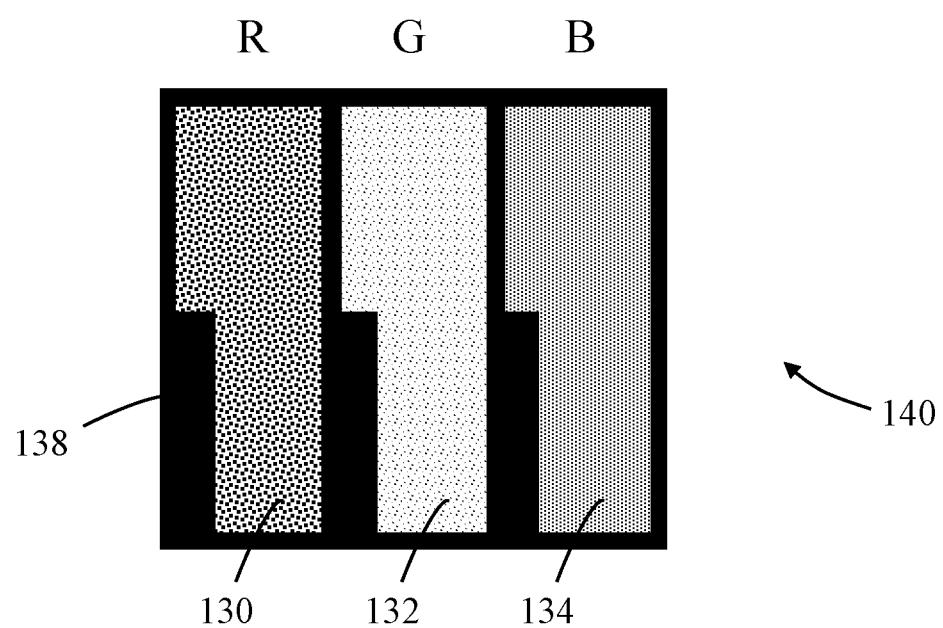
FIG. 2 is a schematic diagram of the unit pixel of the LCD of FIG. 1.

FIG. 2 is a schematic diagram of the unit pixel 140 illustrating the combined layer 160 which comprises an array of the different color sub-pixels 130, 132, 134 which emit red (R), green (G), and blue (B) light respectively. The sub-pixels 130, 132 comprise a mixture of a photoluminescence material and a color filter pigment and, in operation, respectively emit red (R) and green (G) in response to blue excitation light from a backlighting unit 104; whereas the sub-pixels 134 comprise only a color filter pigment and, in operation, allow blue light from the backlighting unit 104 to pass through. The combined layer 160 acts both for color sub-pixel light generation and color filtering to reduce cross-talk. One key advantage of this approach is that only one pixel structure layer is necessary, which is the photoluminescence material (e.g., phosphor or quantum dots) and color filter pigment combined together to form the single combined layer 160.

Figure 3:
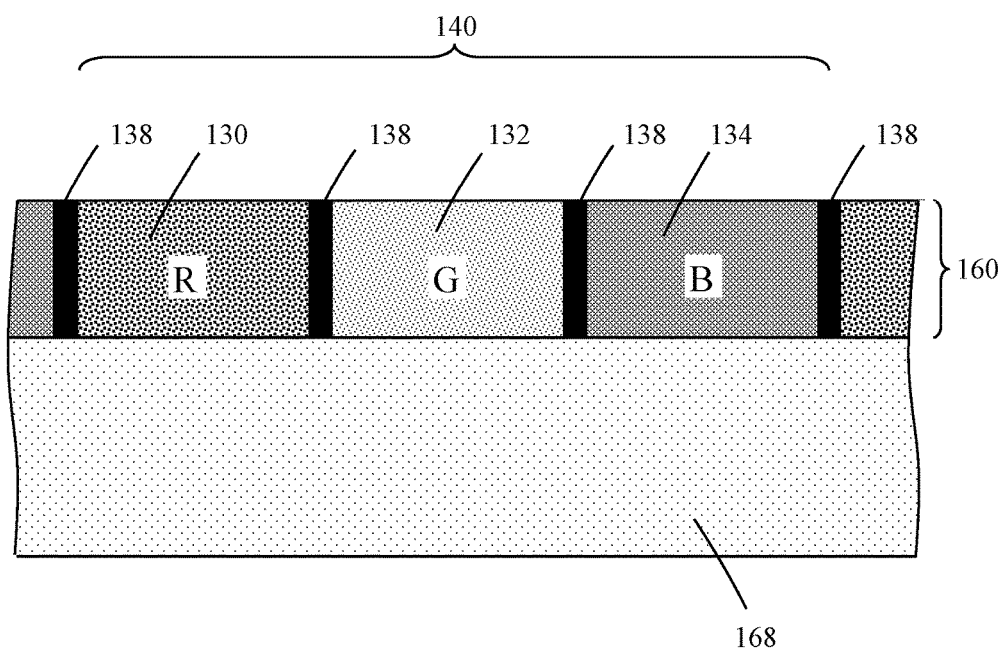
FIG. 3 is a side elevation of the combined layer of the LCD of FIG. 1.

FIG. 3 is a side elevation of the combined layer of the LCD of FIG. 1. The RGB sub-pixels 130, 132, 134 are packaged on the substrate 168 (e.g., a glass substrate) having opaque dividers/walls 138 between each of the sub-pixels 130, 132, 134 having a mixture of both the photoluminescence material and color filter pigment combined together. Each of the sub-pixels 130, 132, 134 provides light emissions and filtering at the primary red (R), green (G), and blue (B) colors. The dividers 138 can be formed as a grid mask of metal, such as for example chromium, defining the sub-pixels 130, 132, 134 and providing an opaque gap between the sub-pixels 130, 132, 134 and unit pixels 140. Additionally, the black matrix shields the TFTs from stray light and prevents cross-talk between neighboring sub-pixels/unit pixels. To minimize reflection from the black matrix, a double layer of Cr and CrOx may be used, but of course, the layers may comprise materials other than Cr and CrOx. The black matrix film which can be sputter-deposited underlying or overlying the photoluminescence material may be patterned using methods that include photolithography.

Figure 5:
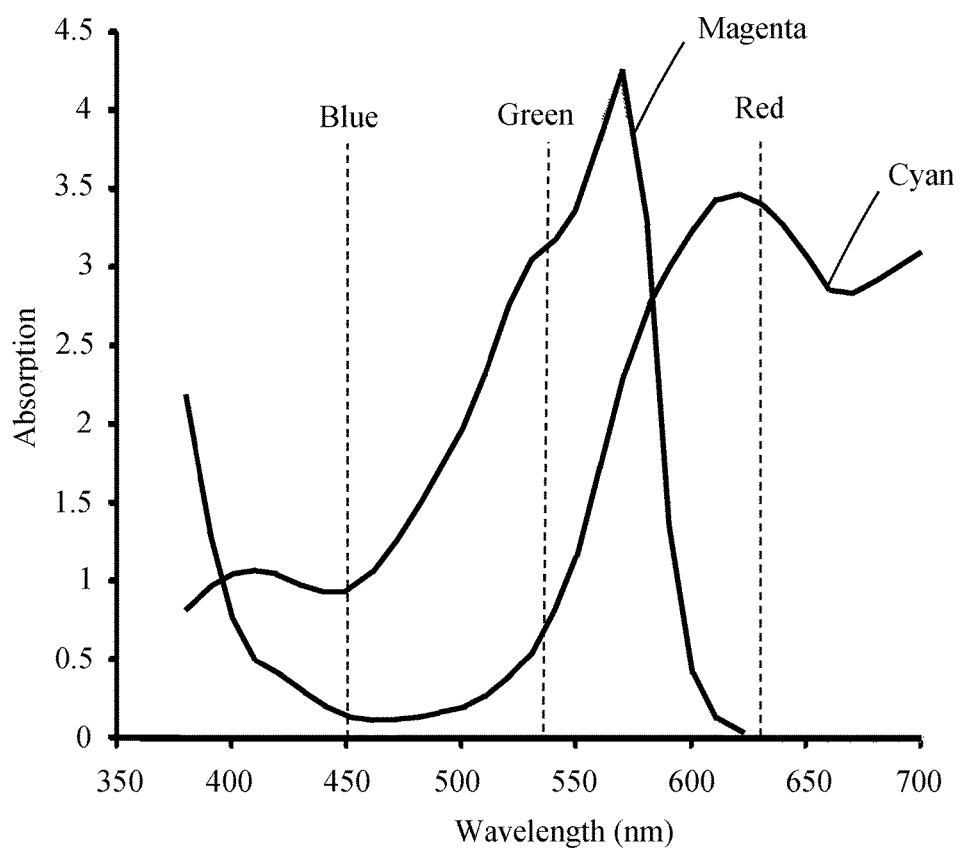
FIG. 5 shows absorption characteristics for magenta, cyan, and blue filter pigments.

Unlike conventional RGB color filters which use red, green and blue filter pigments, the filter pigments used in the combined layer 160 of the present invention does not include the use of such standard red, green, and blue color filter pigments. This is because using a red pigment in the red sub-pixels would inhibit sufficient blue light from entering such sub-pixels to excite the red photoluminescence materials. Therefore, the filter pigment needs to be carefully selected to permit passage of sufficient blue light (and red light), while filtering out other colors of light. In some embodiments, in the red sub-pixels, red photoluminescence material is mixed with a magenta filter pigment. The magenta filter pigment is the material in the red sub-pixels that provides the color filtering, since magenta filter pigments will absorb green light while allowing red and blue light to pass through. This permits blue light from the backlighting module to enter into the red sub-pixels and excite the red photoluminescence materials (e.g., quantum dots) to emit red light. When the concentration of red photoluminescence materials and magenta filter pigments is high enough, only red light will be emitted from the red sub-pixels. In some embodiments, absorption characteristics of an example magenta pigment are shown in FIG. 5.

In a similar manner, a standard green color filter pigment will not be used as the filter materials for the green sub-pixels. Instead, the green sub-pixels will contain green photoluminescence materials and cyan filter pigments, where the cyan filter pigments function as the filter materials. Since cyan filter pigments absorb red light while passing blue and green light through, green photoluminescence materials can therefore be excited by the blue light and emit green light. When the concentration of green photoluminescence materials and cyan filter pigments is high enough, only green light will be emitted from the green sub-pixels. In some embodiments, absorption characteristics of an example cyan filter pigment are shown in FIG. 5.

For the blue sub-pixels, no photoluminescence materials are necessary when the backlight comprises blue LEDs. Therefore, only blue filter pigments are used for the blue sub-pixels. Blue light will pass through blue sub-pixels directly and red/green light will be blocked.

In accordance with embodiments of the present invention, the sub-pixels of an LCD comprise a mixture of a photoluminescence material and color filter pigments having specific characteristics. Such an arrangement addresses the problem of cross-talk between sub-pixels and sharpens the color of the display. Since the photoluminescence process is isotropic, photoluminescence generated light is emitted in all directions including those back towards the backlighting unit 104. Since the backlighting unit 104 is common to all sub-pixels 130, 132, 134 of the LCD 100, once such light enters the backlighting unit 104 it could then be emitted from sub-pixels of a different color. For example, green light generated by a green sub-pixel 132 which enters the backlighting unit 104 can then be emitted from a red or a blue sub-pixel 130, 134 and such emission, if unchecked, would degrade the LCD's 100 performance. Likewise, red light generated by a red sub-pixel 130 which enters the backlighting unit 104 can then be emitted from a green or a blue sub-pixel 132, 134 and such emission, if unchecked, would degrade the LCD's 100 performance. It is the inclusion of the color filter pigment with the photoluminescence materials with a specific optical characteristic that blocks the emission of light that does not correspond to the color of the sub-pixel. For instance, the inclusion of a cyan filter pigment in the green sub-pixels 132 prevents red light from being emitted from green sub-pixels 132. Similarly, the inclusion of a magenta filter pigment in the red sub-pixels 130 prevents green light from being emitted from red sub-pixels 130.

Further, the inclusion of a color filter pigment having specific characteristics with the photoluminescence material further eliminates the need for a separate color filter plate. This reduces cost and improves efficiency of manufacture.

Different types of photoluminescence materials, such as quantum dots, inorganic and organic phosphor materials, can be used for the photoluminescence sub-pixels of the display.

Quantum dots can comprise different materials, for example cadmium selenide (CdSe). The color of light generated by a quantum dot is enabled by the quantum confinement effect associated with the nano-crystal structure of the quantum dots. The RGB quantum dots can, compared with other photoluminescence materials, generate pure (narrow bandwidth) and saturated emission colors. The energy level of each quantum dot relates directly to the size of the quantum dot. For example, the larger quantum dots, such as red quantum dots, can absorb and emit photons having a relatively lower energy (i.e. a relatively longer wavelength). On the other hand, the green and blue quantum dots, which are smaller in size can absorb and emit photons of a relatively higher energy (shorter wavelength). Hence, the wavelength of the emitted light from the RGB quantum dots can be configured by careful selection of the size of the quantum dots. Additionally, photoluminescence color displays are envisioned that use cadmium free quantum dots and rare earth (RE) doped oxide colloidal phosphor nanoparticles, in order to avoid the toxicity of the cadmium in the quantum dots. It is believed that the use of quantum dot materials as the sub-pixels of a photoluminescence color display is inventive in its right.

There are a variety of compositions available for the red (R) and green (G) quantum dots of the combined layer 160. Examples of suitable quantum dots composition is given in Table 1.

TABLE 1

Chemical formula of example quantum dots compositions

| GREEN (530 nm-540 nm) | RED (610 nm-630 nm) |
|---|---|
| CdSe ~2.9 nm | CdSe ~4.2 nm |
| $Cd_xZn_{1-x}Se$ | $Cd_xZn_{1-x}Se$ |

TABLE 1-continued

Chemical formula of example quantum dots compositions

| GREEN (530 nm-540 nm) | RED (610 nm-630 nm) |
|---|---|
| CdZnSeS | CdZnSeS |
| $CdSe_xS_{1-x}$ | $CdSe_xS_{1-x}$ |
| CdTe | CdTe |
| $CdTe_xS_{1-x}$ | $CdTe_xS_{1-x}$ |
| CdS | — |
| InP | InP |
| $In_xGa_{1-x}P$ | $In_xGa_{1-x}P$ |
| — | InAs |
| $CuInS_2$ | $CuInS_2$ |
| $CuInSe_2$ | $CuInSe_2$ |
| $CuInS_xSe_{2-x}$ | $CuInS_xSe_{2-x}$ |
| $CuIn_xGa_{1-x}S_2$ | $CuIn_xGa_{1-x}S_2$ |
| $CuIn_xGa_{1-x}Se_2$ | $CuIn_xGa_{1-x}Se_2$ |
| $CuGaS_2$ | $CuGaS_2$ |
| $CuIn_xAl_{1-x}Se_2$ | $CuIn_xAl_{1-x}Se_2$ |
| $CuGa_xAl_{1-x}Se_2$ | — |
| $CuInS_{2x}ZnS_{1-x}$ | $CuInS_{2x}ZnS_{1-x}$ |
| $CuInSe_{2x}ZnSe_{1-x}$ | $CuInSe_{2x}ZnSe_{1-x}$ |

The quantum dots material can comprise core/shell nano-crystals containing different materials in an onion-like structure. For example, the above exemplary materials in Table 1 can be used as the core materials for the core/shell nano-crystals.

The optical properties of the core nano-crystals in one material can be altered by growing an epitaxial-type shell of another material. Depending on the requirements, the core/shell nano-crystals can have a single shell or multiple shells. The shell materials can be chosen based on the band gap engineering. For example, the shell materials can have a band gap larger than the core materials so that the shell of the nano-crystals can separate the surface of the optically active core from its surrounding medium.

In the case of the cadmiun-based quantum dots, e.g. CdSe quantum dots, the core/shell quantum dots can be synthesized using the formula of CdSe/ZnS, CdSe/CdS, CdSe/ZnSe, CdSe/CdS/ZnS, or CdSe/ZnSe/ZnS. Similarly, for $CuInS_2$ quantum dots, the core/shell nanocrystals can be synthesized using the formula of $CuInS_2$/ZnS, $CuInS_2$/CdS, $CuInS_2$/$CuGaS_2$, $CuInS_2$/$CuGaS_2$/ZnS and so on.

As well as quantum dots, the photoluminescence materials for red and green sub-pixels of the combined layer 160 can comprise a variety of other photoluminescence materials including organic and inorganic phosphor materials. Examples of organic phosphors include organic dyes such as red light emitting dyes, and green light emitting dyes. An example of a suitable red light emitting dye is ADS™-100RE (American Dye Source Inc., Canada). An example of a suitable green light emitting dye is ADS™-085GE (American Dye Source Inc., Canada).

In addition, organic dyes can be chosen from dyes used for tunable dye lasers that can be adequately excited with blue light. Useful light emitting dyes may include, but are not limited to, Lumogen™ F Red 300 (red emitter), Lumogen™ Red 300 Nanocolorant™ (red emitter), and ADS™ 100RE (red emitter) (American Dye Source Inc., Canada). Useful green light emitting dyes may include, but are not limited to, ADS™ 085GE (American Dye Source Inc., Canada).

Also, there are a variety of compositions available for the red and green inorganic phosphors of the combined layer 160. The host material is typically an oxide, and may comprise an aluminate, silicate, phosphate or borate, but the host material is not restricted to these classes of compounds. The red and green phosphors, for example, can comprise an aluminate, a silicate, a sulfate, an oxide, a chloride, a fluoride, and/or a nitride, doped with a rare-earth element called an activator. The activator may include divalent europium or cerium, but the activator is not limited to these elements. Dopants such as halogens can be substitutionally or interstitially incorporated into the crystal lattice and can for example reside on oxygen lattice sites of the host material and/or interstitially within the host material. Examples of suitable phosphor composition along with the range of wavelengths at which they may be excited is given in Table 2.

TABLE 2

Chemical formula of example phosphor compositions

| Excitation wavelength | Example phosphor compositions | |
|---|---|---|
| | Green | Red |
| 400~480 nm | $(Sr, Ba, Mg)_2SiO_4$:Eu, F | $(Sr, Ba, Mg, Al)_3SiO_5$:Eu, F |

There are a variety of ways in which the RGB photoluminescence materials can be incorporated into/onto the combined layer 160.

For example, the red and green quantum dots can be deposited directly on a substrate 168 using a printing process. The printing process can form a thin layer of quantum dots without using a solvent. Thus, a printing process can be simple and efficient with high throughput.

Most inorganic phosphor materials are hard substances, and the individual particles may have a variety of irregular shapes. It can be difficult to incorporate them directly into a plastics resin, however, phosphors are known to be compatible with acrylic resins, polyesters, epoxies, polymers such as polypropylene and high and low density polyethylene (HDPE, LDPE) polymers. Materials may be cast, dipped, coated, extruded or molded. In some embodiments, it may be preferable to use master batches for incorporating the phosphor-containing materials into clear plastics, which may then be coated onto the glass substrate 168 of the combined layer 160. In reality, any of the methods that are used for fabricating the filter plate of an LCD, such methods being screen printing, photolithography, and ink printing techniques, may also be used to fabricate the present combined layer 160.

Figure 4:
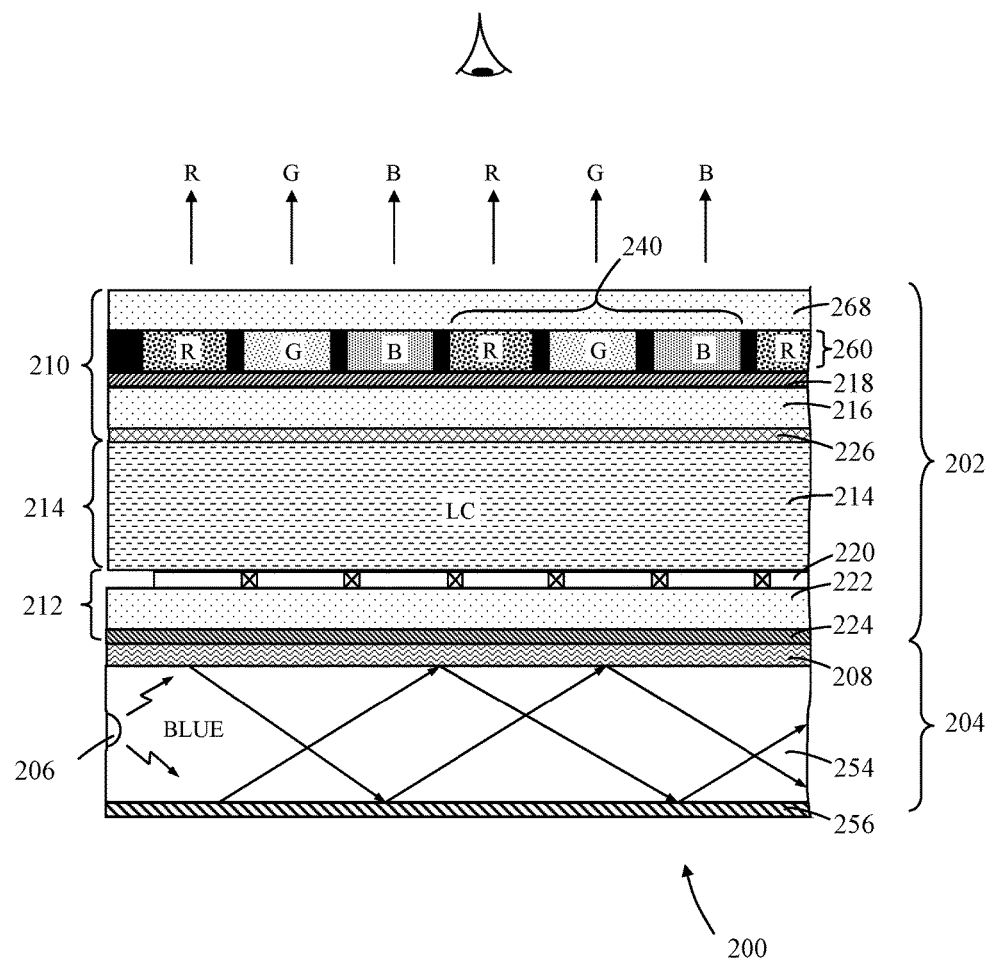
FIG. 4 is a schematic of a photoluminescence color LCD formed in accordance with an another embodiment of the present invention.

FIG. 4 is a schematic of a photoluminescence color LCD 200 formed in accordance with another embodiment of the present invention. The reference numerals in FIG. 4 denote the same features as those of FIG. 1. Hence, like reference numerals denote like features. In this embodiment, the combined layer 260 of the photoluminescence materials and color filter pigments is located on the upper surface of the front plate 210 facing the polarizing layer 218 (i.e., on the viewing side of the display panel 202). As with the previous embodiment, locating the combined layer 260 outside of the polarizing layers 218 and 224 ensures that the random polarization of photoluminescence generated light (e.g. quantum dot emissions) will not interfere with LCD module mechanisms.

The arrangement of FIG. 4 also addresses the problem of cross-talk between sub-pixels and sharpens the color of the display. For example, green light generated by a green sub-pixel 232 which passes through the liquid crystal 214 and enters the backlighting unit 204 can lead to it being undesirably emitted from a red or a blue sub-pixel 230, 234. Such emission, if unchecked, would degrade the LCD's 200 performance. Likewise, red light generated by a red sub-pixel 230 which passes through the liquid crystal 214 and enters the backlighting unit 204 can lead to it being undesirably emitted from a green or a blue sub-pixel 232, 234. Such emission, if unchecked, would degrade the LCD's 200 performance. It is the inclusion of the color filter pigment with the photoluminescence materials with a specific optical characteristic that blocks the emission of light that does not correspond to the color of the sub-pixel. For instance, the inclusion of a cyan filter pigment in the green sub-pixels 232 prevents red light from being emitted from green sub-pixels 232. Similarly, the inclusion of a magenta filter pigment in the red sub-pixels 230 prevents green light from being emitted from red sub-pixels 230.

Further, the inclusion of a color filter pigment having specific characteristics with the photoluminescence material further eliminates the need for a separate color filter plate. This reduces cost and improves efficiency of manufacture.

It will be appreciated that the present invention is not restricted to the specific embodiments described and that variations can be made that are within the scope of the invention. For example, in some embodiments, the combined layer 160 can be fabricated directly on the front plate 110 or back plate 112 as opposed to on a separate substrate 168. When providing the combined layer 160 on the back plate 112, for ease of fabrication the combined layer 160 can be fabricated on a lower side of the back plate 112. In other arrangements, it can be provided on the upper surface of the back plate 112 and the second polarizing layer 124 provided on top of the combined layer 160.

What is claimed is:

1. A photoluminescence color display comprising:
   a display panel comprising a plurality of red, green and blue sub-pixel areas; and
   an excitation source operable to generate blue excitation light;
   wherein said red sub-pixel areas comprise a mixture of a first photoluminescence material that is operable to emit red light in response to said blue excitation light and a first color filter pigment having a first optical characteristic that allows passage of said blue excitation light to said first photoluminescense material, allows emission of said red light, and substantially prevents emission of green light from said red sub-pixel areas;
   said green sub-pixel areas comprise a mixture of a second photoluminescence material that is operable to emit said green light in response to said blue excitation radiation and a second color filter pigment having a second optical characteristic that allows the passage of said blue excitation light to said second photoluminescense material, allows emission of said green light, and substantially prevents emission of said red light from said green sub-pixel areas; and
   said blue sub-pixel areas comprise a third color filter pigment having a third optical characteristic that allows the emission of said blue excitation light and substantially prevents emission of said red light and said green light from said blue sub-pixel areas,
   wherein the first color filter pigment is magenta and the second color filter pigment is cyan, the red, green and blue sub-pixel areas comprise a combined layer of said photoluminescence materials and color filter pigments, and the photoluminescence color display comprises polarizing layers where the combined layer is located outside of the polarizing layers.

2. The photoluminescence color display of claim 1, wherein the third color filter pigment is blue.

3. The photoluminescence color display of claim 1, wherein the photoluminescence materials comprise an inorganic phosphor material.

4. The photoluminescence color display of claim 1, wherein the photoluminescence materials comprise an organic phosphor material.

5. The photoluminescence color display of claim 1, wherein the photoluminescence materials comprise quantum dots materials.

6. The photoluminescence color display of claim 5, wherein the photoluminescence materials comprise cadmium free quantum dots.

7. The photoluminescence color display of claim 5, wherein said photoluminescence materials comprise quantum dots materials comprise materials selected from the group consisting of: cadmium selenide (CdSe); cadmium zinc selenide ($Cd_xZn_{1-x}Se$); cadmium zinc selenide sulfide (CdZnSeS); cadmium selenide sulfide ($CdSe_xS_{1-x}$); cadmium telluride (CdTe); cadmium telluride sulfide ($CdTe_xS_{1-x}$), cadmium sulfide (CdS), cadmium zinc sulfide ($Cd_xZn_{1-x}$); indium phosphide (InP); indium gallium phosphide ($In_xGa_{1-x}P$); indium arsenide (InAs); copper indium sulfide ($CuInS_2$); copper indium selenide ($CuInSe_2$); copper indium sulfide selenide ($CuIn_xSe_{2-x}$) copper indium gallium sulfide ($CuIn_xGa_{1-x}S_2$); copper indium gallium selenide ($CuIn_xGa_{1-x}Se_2$); copper gallium sulfide ($CuGaS_2$); copper indium aluminum selenide ($CuIn_xAl_{1-x}Se_2$); copper gallium aluminum selenide ($CuGa_xAl_{1-x}Se_2$); copper indium sulfide zinc sulfide ($CuInS_{2x}ZnS_{1-x}$); and copper indium selenide zinc selenide ($CUInSe_{2x}ZnSe_{1-x}$).

8. The photoluminescence color display of claim 1, and further comprising:
   a liquid crystal disposed between front and back plates of the display panel; and
   a matrix of electrodes defining the red, green and blue sub-pixel areas operable to selectively induce an electric field across the liquid crystal in the sub-pixel areas for controlling transmission of light through the sub-pixels areas.

9. The photoluminescence color display of claim 8, wherein the photoluminescence materials are located on a face of the back plate.

10. The photoluminescence color display of claim 8, wherein the photoluminescence materials are located on a face of the front plate.

11. The photoluminescence color display of claim 1, wherein the blue excitation radiation has a wavelength in a range of 400 nm to 480 nm.

* * * * *